(12) United States Patent
Mentink et al.

(10) Patent No.: US 8,080,115 B2
(45) Date of Patent: *Dec. 20, 2011

(54) METHOD FOR THE SURFACE TREATMENT OF A METALLIC OR FIBROUS MATERIAL

(75) Inventors: Léon Mentink, Lille (FR); Joël Bernaerts, Labeuvriere (FR)

(73) Assignee: Roquette Freres, Lestrem (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/914,235

(22) PCT Filed: May 10, 2006

(86) PCT No.: PCT/FR2006/001042
§ 371 (c)(1),
(2), (4) Date: Dec. 10, 2007

(87) PCT Pub. No.: WO2006/120343
PCT Pub. Date: Nov. 16, 2006

(65) Prior Publication Data
US 2008/0191171 A1    Aug. 14, 2008

(30) Foreign Application Priority Data
May 12, 2005    (FR) .................................. 05 04780

(51) Int. Cl.
*B08B 7/00* (2006.01)
*C23G 1/00* (2006.01)
*C23G 5/00* (2006.01)
*C11D 3/20* (2006.01)
*B01F 1/00* (2006.01)

(52) U.S. Cl. ........................... 134/40; 510/245; 252/364
(58) Field of Classification Search ............. 252/182.12, 252/364; 134/40; 510/245
See application file for complete search history.

(56) References Cited

U.S. PATENT DOCUMENTS

| 5,258,070 | A | 11/1993 | Monteleone et al. |
| 5,421,907 | A | 6/1995 | De Nieendick et al. |
| 5,843,194 | A | 12/1998 | Spaulding et al. |
| 6,172,031 | B1 * | 1/2001 | Stevens ..................... 510/417 |
| 6,689,223 | B1 * | 2/2004 | Meine et al. .................. 134/2 |
| 2002/0035070 | A1 * | 3/2002 | Gardlik et al. ................. 514/23 |
| 2002/0147122 | A1 * | 10/2002 | Shick et al. .................. 510/295 |
| 2004/0072704 | A1 * | 4/2004 | Gerke et al. .................. 510/101 |
| 2005/0089539 | A1 * | 4/2005 | Scholz et al. ................. 424/401 |

FOREIGN PATENT DOCUMENTS
WO    2004/105722 A1    12/2004

* cited by examiner

Primary Examiner — Lorna M Douyon
Assistant Examiner — Tanisha Diggs
(74) Attorney, Agent, or Firm — Young & Thompson

(57) ABSTRACT

The invention relates to a surface treatment method, in which a material other than the human body, which is selected from metallic materials and fibrous materials, is brought into contact with a composition comprising at least one dianhydrohexitol ether (compound A). The dianhydrohexitol ether can be associated with a compound B which is selected from among solubilising agents, acid agents and alkaline agents. The fibrous material to undergo surface treatment is chosen from the following materials in particular, namely: wood materials, vegetable materials, paper materials and textile materials.

5 Claims, No Drawings

METHOD FOR THE SURFACE TREATMENT OF A METALLIC OR FIBROUS MATERIAL

This is an application filed under 35 U.S.C. 371 of PCT/FR2006/001042 filed on May 10, 2006, which claims priority to France application 0504780 filed on May 12, 2005.

BACKGROUND OF THE INVENTION

1. Field of the Invention

The subject matter of the present invention is a process for the surface treatment of a material other than the human body, chosen from metallic and fibrous materials, which comprises contacting said metallic or fibrous material with a composition comprising at least one dianhydrohexitol ether, preferably dimethyl isosorbide ("DMI") or dimethyl isoidide ("DMIi").

2. Description of the Related Art

Among dianhydrohexitol ethers, DMI, which has been known for more than 50 years, is that which has formed the subject of the greatest number of studies in terms of preparation and of applications. This compound is very particularly recommended in the treatment of the human body as vectorizing agent for active principles which allows the latter to more effectively reach their target inside the human body. It is used in particular as "skin penetrant" for the purpose of improving the penetration of active principles into the surface layers of the epidermis of protein nature (keratin). Its use as vector of keratolytic agent for the purpose of improving the percutaneous absorption of said agent is, for example, described in patent application WO 2004/105722.

However, it should be noted that, to date, in the pharmaceutical and cosmetic fields, DMI is made use of industrially and commercially only in relatively restricted amounts, this being the case in applicative "niches", such as self-tanning creams or anti-acne creams.

In the context of the treatment of the human body, a description has also been given, in U.S. Pat. No. 5,258,070, of the treatment of the nails with a composition intended to remove varnish deposited beforehand at their surface. Within this composition, the DMI is present in an amount of 5% by weight only (according to the examples) and acts only as "catalyst", allowing the specific binary mixture of propylene carbonate and of propylene glycol to act effectively as solvent of the nail varnish. Furthermore, it is emphasized that the DMI/propylene carbonate binary mixture or the DMI/propylene glycol binary mixture has no role in dissolving the varnish. In this document, the precise effects of the DMI are not clearly apparent, in particular with regard to its potential abilities, which are undesired here, to penetrate inside the constituent keratin of the nail and to carry therein one and/or other of the solvents.

In any case, such DMI-comprising solvent compositions for nail varnishes have never a priori been marketed and it must be considered, in view of the above, that if they were to be marketed one day, they would comprise only a low or very low proportion of DMI.

With regard to the treatment of a material other than the human body, to the knowledge of the Applicant Company, there exists only a single published document, namely U.S. Pat. No. 5,843,194, which discloses the use of DMI in the specific field of gelled compositions intended for the preparation of candles. In this specific context, the DMI is used in the constituent body of the candle, necessarily in small proportions (6% maximum in practice) and in combination with isostearyl alcohol, this being for esthetic purposes and in particular as flame-enhancing agent. However, it appears that, in the absence of isostearyl alcohol, the DMI does not make it possible to obtain a candle which is satisfactory in terms of combustion and also transparency. To the knowledge of the Applicant Company, the use of DMI in the preparation of candles, in particular as flame-enhancing agent, has never undergone industrial and commercial development.

The observation may thus be made that, to date, the industrial and commercial exploitation of dianhydrohexitol ethers including DMI, remains very limited in the field of the treatment of the human body and is absent in the other fields, in particular in the fields of detergency, inks and paints, construction materials, metallurgy, printing, papermaking, the textile industry, plant protection products, adhesives, industrial coatings and electronics.

SUMMARY OF THE INVENTION

The Applicant Company has now found that the properties, not revealed to date, of dianhydrohexitol ethers can be made use of in numerous other fields. In particular, it is observed that the use of dianhydrohexitol ethers in compositions specifically intended for the surface treatment of certain metal or fibrous materials other than the human body makes it possible to remarkably enhance the possibilities of industrial and commercial exploitation not only of said ethers but also of other compounds, of diverse natures and functionalities, which can advantageously be used in combination with said ethers.

Remarkably, it has been found that the effect of such a use of dianhydrohexitol ethers is to not detract from, and indeed even to improve a) the conditions of preparation and/or of use of these surface treatment compositions and also b) the intermediate or final physical performances and characteristics of said compositions, indeed even of the metal or fibrous materials the surface of which had been treated with such compositions.

Consequently, a subject matter of the present invention is a process for the surface treatment of a material other than the human body, chosen from metallic materials and fibrous materials, said process using a composition comprising at least one compound A chosen from dianhydrohexitol ethers.

DETAILED DESCRIPTION OF THE INVENTION

The term "surface treatment of a material other than the human body" is intended to mean any operation applied to the surface of any material, of organic and/or inorganic nature, other than the human body. This definition excludes, in particular, the treatments applied, directly and "in vivo", to human beings, including their skin and their nails, for the purpose of a therapeutic or cosmetic effect, and treatments carried out within the entirety of the mass making up the material in question, for example by mixing of the composition with said material.

The material that is surface-treated in accordance with the invention is chosen from metal materials and fibrous materials. It can, however, exhibit, within these groups, extremely variable origins, natures, properties and destinations. It can be any metal material which can exist in the form of articles and structures of any shape, size and functionality, such as rods, foils, films, coatings, plates, sheets, parts intended for the motor vehicle, ship building or aeronautical industries, car bodies, vehicles, frameworks, vats, forms, packaging boxes, molds, pipes, rollers, printer's blankets, pumps, tools, equipment, instruments, screws and bolts, cutlery, prostheses, parts intended for domestic electrical appliances, electronic or microelectronic components, floppy disks, semiconductor components, etc.

The fibrous material to be surface-treated can be, by way of examples:

- a ligneous material which exists, for example, in the form of articles made of wood, such as doors, windows, shutters, frames, posts, laths, wooden floors, panels, tables, furniture, forms, tools, instruments, including articles based on wood fibers and, optionally on inorganic or plastic fibers and/or fillers, such as insulating panels or composite materials,
- a plant material, such as seeds, leaves, stems, flowers, fruits, vegetables, roots, cellulose or hemicellulose fibers or other plant extracts,
- a textile material which can exist in the form of yarns, filaments, fibers or textile laps of natural or synthetic origin, of woven or nonwoven articles, of clothes, wipes, curtains, cloth,
- a paper material, such as, for example, paper fibers, or fabrics, a sheet of paper, board or corrugated board.

In particular, the surface treatment can have the aim or effect of cleaning and/or of upgrading all or part of the surface of this metal or fibrous material and for example can consist of an operation of washing, cleaning, in particular exact cleaning, wetting, rinsing, degreasing, jacketing, secure bonding, covering, applying a film or thin film, surface improvement (including paper), coating (including paper), deicing, disinfecting, decontaminating, dedusting, stripping, abrasion, smooth finishing, rust prevention treatment, corrosion prevention treatment, lubrication, waxing, dyeing, painting, varnishing, coloration, gilding, brightening, printing, marking, revealing, de-inking, bleaching, decoloration, deodorization, scenting or aromatization.

In view of the diversity of the metal or fibrous materials to be treated and of the types of surface treatments envisaged above in accordance with the invention, recourse is made industrially for the purpose of said surface treatments to a multitude of compositions existing in different forms (liquid, emulsified, pasty, solid, gas, as aerosol), including in the form of finished or semifinished articles with highly variable structures, sizes and presentation forms, and exhibiting necessarily highly diverse functionalities such as solvating, cleaning, detergent, stain-removing, stripping, degreasing, de-dusting, lubricating, antifreeze, disinfectant, deodorizing, scenting, decorative, adhesive or film-forming compositions. They may, in particular, be compositions, which are or are not completely formulated and which can or cannot be used directly in this form, of paints, of latexes, of coating colours, of inks, of lacquers, of wood stains and varnishes, of glues and adhesives, of cutting oils, of machining fluids, of drilling fluids, of photographic baths, of strippers, of liquid, powder or tablet detergents, in particular for washing dishes (cutlery), linen or metal chambers, of exact cleaning compositions for photolithography, of wetting compositions for printing (fountain solutions), of coating compositions for metal cans or coils (can coating compositions or coil coating compositions), of impregnated wipes or plant protection products, including with a fungicidal or herbicidal activity.

Whatever the functionality and the destination in each of these compositions, it is desired, in current industrial practice, for any means employed during its preparation to be able to exhibit all of the criteria listed below:

a) to be sufficiently effective for any function for which it is intended for a given surface treatment,
b) not to damage and if possible to improve, the conditions of preparation and/or the conditions of use of any composition in which it is incorporated for the purpose of a given surface treatment,
c) not to damage and if possible to improve, the intermediate and final physical performances and characteristics of said composition or of any material surface-treated with said composition,
d) to exhibit high harmlessness and the minimum of inconveniences, particularly in terms of protection of man and of the environment,
e) to result in materials of natural origin which are, if possible, renewable.

In particular, there is a very particular desire for a means which:

a) is truly effective, for example, as cleaning, wetting, dispersing, lubricating, compatibilizing and/or coalescence agent,
b) can advantageously be used in compositions intended to be applied to a surface (i) both under cold conditions and under hot conditions and/or both at neutral pH and at acidic or basic pH,
c) does not damage, if possible improves, the physical, organoleptic and more generally applicative characteristics, for example, the film-forming power, the wetting power, viscosity, the volatility, the immiscibility with water, the chemical stability, the color, the transparency and/or the odor, of said compositions and also the characteristics, including organoleptic characteristics, of any material, for example, of any surface made of metal, of wood, of paper or textile, surface-treated with said compositions,
d) is ecologically more acceptable than the adjuvants with the same functionality(ies) conventionally used, for example, glycol ethers, hydrocarbons of fossil origin or chlorinated solvents in general, and in particular:

- does not comprise dangerous substances and in particular substances recognized as toxic, carcinogenic or mutagenic,
- exhibits a low proclivity to generate volatile organic compounds (COV), including when the compositions comprising it are applied under hot conditions, and in particular exhibits a vapor pressure at 25° C. of less than 13.3 Pa, so as to protect the ozone layer,
- exhibits a high flashpoint, preferably greater than 60° C., in particular greater than 70° C., so as not to induce an explosion,
- exhibits an acceptable odor, in all cases significantly less inconvenient or irritating than conventional adjuvants in general,
- exhibits good rinsability, i.e. a good ability to be entrained by an aqueous solution while being harmless to the environment (absence of bioaccumulation, absence of toxicity for the flora and fauna, in particular aquatic, and satisfactory biodegradability).

For the purpose of limiting the use of compounds recognized as dangerous or toxic to man and/or the environment, such as hydrocarbons of fossil origin, chlorinated solvents or glycol ethers, it has in particular been proposed for about thirty years to replace them all or in part with compositions based on ester(s).

The use of esters of lactic acid has, for example, been described:

- in the preparation of paints, lacquers or varnishes in U.S. Pat. No. 3,985,691, EP 659 856 or EP 851 298,
- in combination with glycerides or derivatives, in the preparation of solvating compositions in general in patent WO 01/18162 or solvating compositions specifically intended for the cleaning of surfaces stained with ink in patent WO 01/74984,
- in the preparation of lubricating compositions in patent WO 03/106599, in the form of derivatives of mono- and poly(alkyl lactyllactate) type in the cleaning or degreasing of metal parts in patent WO 03/087284.

However, the compositions comprising lactic acid esters exhibit a number of disadvantages and in particular: a lack of solvating power for very hydrophobic materials, a relatively pronounced odor, a relatively low flashpoint (46° C. for ethyl lactate) and high flammability, a high vapor pressure, high instability in an alkaline medium, relatively low resistance to hydrolysis and an irritant nature (presence of free lactic acid).

In order to overcome all or some of these disadvantages, it has been recommended to combine said esters respectively:
  with esters of fatty acids for the purpose of increasing the flashpoint of the resultant solvating compositions (WO 01/18162),
  with tertiary amines for the purpose of improving the odor of these (WO 03/016449),
  with d-limonene for the purpose of improving the possibilities of use thereof in general, including the solvating power for very hydrophobic materials (U.S. Pat. No. 6,797,684).

For the purpose of limiting the use of solvents recognized as dangerous to man and/or the environment, the proposal has also been made to replace them, in all or in part, in combination or not in combination with lactic acid esters, with compositions based on products such as methyl esters of vegetable oils, esters of dicarboxylic acids or dibasic esters (DBE), or terpenes, for example d-limonene.

However, these products exhibit the following disadvantages:
  methyl esters of vegetable oils, for example of rapeseed, soybean, sunflower or castor oil: pronounced odor, pronounced color, immiscibility with water, absence of rinsability, limited solvating power (applicable to few materials and with often limited effectiveness), often unsuitable viscosity, aptitude for setting solid under cold conditions,
  dibasic esters, for example dimethyl esters of adipic acid, glutaric acid or succinic acid and their mixtures: limited solvating power, low miscibility with water, poor rinsability, sometimes unsuitable viscosity (either too low or too high), insufficient stability, irritant nature due to the presence of free acids,
  terpenes (d-limonene): immiscibility with water, nonrinsability, relatively low flashpoint (48° C.), irritant nature, low chemical stability (auto-oxidation).

The Applicant Company has found that, in the specific field of the surface treatment of a material other than the human body, chosen from metal and fibrous materials, it is now possible to dispose of a means which:
  not only, as such, confirms all the abovementioned criteria a) to d),
  but also makes it possible to advantageously formulate, in particular with regard to said criteria, novel surfacetreatment compositions of highly varied natures or functionality(ies).

This means thus consists of the use of a dianhydrohexitol ether (here denoted "compound A") as component of said compositions.

The term "dianhydrohexitol ether" is understood to mean in particular any compound A chosen from dianhydrohexitol monoethers, dianhydrohexitol diethers and the mixtures of these ethers.

Preference is given to dianhydrohexitol alkyl ethers and in particular isosorbide, isomannide and/or isoidide methyl, ethyl, hexyl or 2-ethylhexyl ethers.

Said compound A can, in particular, be composed, in all or predominantly (i.e. for at least 50 of its dry matter), of dimethyl isosorbide ("DMI"), of diethyl isosorbide ("DEI"), of di(2)ethylhexyl isosorbide ("DEHI") and/or of dimethyl isoidide ("DMIi").

Said compound A can be present in all proportions within the composition used in the process of the invention. It can thus, according in particular to the exact nature and the destination of said composition:
  be the predominant component, even the almost exclusive component, of said composition and represent from 51 to 100%, in particular from 55 to 99.5%, of the weight of said composition, or, conversely,
  represent less than 50%, in particular from 10 to 45%, of the weight of said composition.

The dianhydrohexitol ether (compound A) preferably represents more than 5%, preferably more than 10% and more preferably still more than 15% of the weight of said composition.

In a particularly advantageous way the ether may be combined, within said composition, with at least one compound (referred to hereinafter as compound B) chosen from solubilizing agents, alkaline agents or acidic agents.

Also subject matter of the present invention, consequently, is a surface treatment process which comprises contacting a material other than the human body, chosen from the metal materials and fibrous materials, with a composition comprising at least one dianhydrohexitol ether (compound A) and at least one compound B chosen from solubilizing agents, alkaline agents and acidic agents.

Compound A may be the majority component or, conversely, the minority component relative to compound B.

According to a first alternative form, compound A and compound B are present in the composition used in the process of the invention according to a compound A/compound B ratio by weight, expressed as dry weight for dry weight, of between 2/98 and 98/2, preferably of between 5/95 and 95/5.

As indicated above, compound B, which is an optional component, may in particular be chosen from solubilizing agents.

The term "solubilizing agents" referred in particular to solvents classed within the following categories: light solvents, heavy solvents, coupling solvents ("secondary solvents") and solvent-surfactant compounds.

Whether belonging or not to the aforementioned categories, the solubilizing agents may in particular belong to one of the following classes:
  fatty alcohols which are liquid at 25° C., such as butanol, isobutanol, isobutyl carbinol, hexanol, heptanol, octanol, nonanol and decanol,
  nonfatty alcohols, such as sugar alcohols, in particular hexitols, anhydrohexitols, such as isosorbide and pentitols, glycerol, methanol, ethanol, 2-butoxyethanol, isopropanol, propan-1-ol and benzyl alcohol,
  terpene compounds, such as d-limonene, dipentene, pinenes, essential oils of citrus fruits, of pine, of eucalyptus or of camphor, or oils of turpentine,
  aldehydes, such as benzaldehyde and its derivatives,
  ketones, such as N-methylpyrrolidone (NMP), cyclohexanone and isophorone,
  fluorinated compounds, in particular hydro-fluoroethers (HFEs), hydrofluorocarbons (HFCs), hydrochlorofluorocarbons (HCFCs), such as hydrofluoro-alkanes and hydrochlorofluoroalkanes,
  sulfur-comprising compounds,
  ethers, in particular, of glycerol, of hexylene glycols or propylene glycols, esters, in particular:
- esters of glycerol, such as triacetin, tributyrin, tricaprylin, trioctanin or triolein,
- esters of dianhydrohexitols, in particular of isosorbide, or isomannide or of isoidide,
- esters of nonfatty monoacids, such as methyl, ethyl, butyl, isobutyl, propyl, isopropyl, amyl or benzyl lactates, carbonates or acetates,
- esters of nonfatty polyacids, such as (methyl or isobutyl) citrates, adipates, succinates or glutarates,
- esters of fatty acids, in particular resulting from plant fatty substances (methyl, n-propyl, isopropyl, butyl or ethylhexyl esters), supercritical fluids, in particular supercritical $CO_2$.

According to a first, advantageous variant, the solubilizing agent used in combination with the dianhydrohexitol ether in the composition used in the process according to the invention exhibits:
a) a vapor pressure at 25° C. of less than 13.3 Pa, preferably at most equal to 10 Pa, and/or
b) a flashpoint of greater than 60° C., preferably greater than 70° C. and more preferably still of greater than 85° C., and/or
c) biodegradability such that, after 28 days, at least 20%, preferably at least 70%, of said solubilizing agent has decomposed.

The biodegradability is here measured according to the process, hereinafter denoted "OECD 302 B", recommended by the OECD under the following number and following title: No. 302 B—Inherent Biodegradability: Zahn—Wellens EMPA Test.

According to a second variant, in combination or not in combination with the above, said solubilizing agent is chosen from the group consisting of fatty alcohols which are liquid at 25° C., nonfatty alcohols, esters of glycerol and dianhydrohexitols, esters of nonfatty monoacids, esters of nonfatty polyacids, esters of fatty acids, terpene compounds, glycerol ethers, ethers of propylene glycols, fluorinated compounds, sulfur-comprising compounds, supercritical fluids and the mixtures of these products.

Said solubilizing agent can then advantageously be chosen from the group consisting of a) nonfatty alcohols, in particular isosorbide, glycerol, ethanol, propanol, isopropanol and 2-butoxyethanol, b) esters of glycerol and dianhydrohexitols, in particular triacetin, tributyrin and isosorbide and isoidide acetates, n-butyrates, isobutyrates, hexylates, ethylhexylates and octanoates, c) esters, in particular methyl, ethyl, n-butyl, isobutyl, n-propyl, isopropyl, hexyl and ethylhexyl esters, of lactic acid, acetic acid, adipic acid, succinic acid, glutaric acid and fatty acids comprising from 3 to 24 carbon atoms, d) terpene compounds, in particular d-limonene and pinenes, e) glycerol ethers and f) the mixtures of these products.

Generally, it is preferable to employ a solubilizing agent which is liquid at 25° C.

The Applicant Company has, for the first time and on conclusion of considerable research and analytical work, demonstrated that dianhydrohexitol ethers exhibit many other advantages than those hitherto actually described and made use of for more than 50 years, this being the case more particularly for DMI and in the field of the treatment of the human body (absence of irritant nature and of toxicity to man, weak odor, miscibility with water in all proportions, high flashpoint).

It has in particular shown that these ethers, and in particular DMI, exhibit all of the advantages below, hitherto never described, and a fortiori never made use of, in any case to its knowledge:

- an extremely low rate of evaporation with respect to n-butyl acetate (less than 0.005 to 20° C.), reflecting the very low proclivity to generate volatile organic compounds (VOC),
- a ready biodegradability assessed according to the process recommended by the OECD under No. 301 A (DOC Die-away Test), of greater than 20% at 28 days, in this case of the order of 25, and an aerobic inherent biodegradability (according to the abovementioned process "OECD 302 B") of more than 20% at 28 days, in this case of the order of 36%, said values reflecting the fact that DMI can neither persist indefinitely in the environment nor exhibit any risk of bioaccumulation in the soil, plants or animal tissues,
- an absence of negative effects on the biodegradability of other substances,
- an absence of toxicity for aquatic organisms, such as bacteria, freshwater algae, daphnia and freshwater fish,
- a remarkably wide solvating power, in particular a miscibility with the very great majority of families of solubilizing agents used industrially (alcohols, terpene compounds, aldehyde compounds, ketone compounds, sulfur-comprising compounds, fluorinated compounds, ethers and esters), with the exception of the alkanes alone,
- a compatibilizing or third solvent power of compositions based on alkanes, on mineral oils or petroleum distillates,
- a very high hydrotropic power, that is to say a very strong ability to make possible, in aqueous medium, solubilization of insoluble compounds, such as some coloring materials,
- a high physicochemical stability, both in neutral medium and in acidic or alkaline medium, and
- an absence of corrosive power with regard to the metals conventionally used in an industrial environment such as steel, cast iron, lead, aluminum, copper, tin or brass.

The Applicant Company subsequently conceived that the combination of a dianhydrohexitol ether with products, such as the solubilizing agents set out above, would allow these products, nevertheless of extremely varied chemical nature and intrinsic characteristics, to find novel possibilities of use in the surface treatment of metal or fibrous materials other than the human body, this being the case, in particular as substitutes for dangerous, toxic or contaminating materials contained in surface-treatment compositions.

It has thus been observed that DMI makes it possible, even when it is present to a minor extent with respect to a compound B of solubilizing agent type to provide a certain number of advantageous effects which can vary according to the nature of the solubilizing agent selected.

The Applicant Company has obtained in particular the following results, by combining DMI with one of compounds B below:
- ethyl or butyl lactate: reduction in the odor, increase in the flashpoint, increase in the vapor pressure, increase in the stability, extension of the solvating power,
- d-limonene or dipentene: reduction in the odor, increase in the viscosity, increase in the miscibility with water, increase in the flashpoint, reduction in inflammability, extension of the solvating power,
- dibasic esters: adjustment of the viscosity, improvement in the rinsability, improvement in the stability, reduction in the vapor pressure, reduction in the irritant power, extension of the solvating power,
- methyl esters of fatty acids of vegetable oils: reduction in the color and in the odor, reduction in the temperature for solidification under cold conditions, improvement in the rinsability, extension of the solvating power, N-methylpyrrolidone (NMP): increase in the viscosity, reduction in the vapor pressure, extension of the solvating power.

According to a preferred embodiment, the dianhydrohexitol ether (compound A) is a minor constituent with respect to a solubilizing agent within the composition used according to the invention, which is thus then characterized in that:

compound B is a solubilizing agent; and the compound A/compound B ratio by weight (dry weight/dry weight) is less than 50/50, preferably of between 2/98 and 40/60.

This ratio can in particular be between 5/95 and 25/75.

As indicated above, compound B, which is optional, can also be chosen from alkaline agents.

The term "alkaline agents" is understood to mean in particular the compounds chosen from the group consisting of ammonia, urea, hydroxides, silicates, metasilicates, aluminosilicates, borates, carbonates, bicarbonates, percarbonates, sulfates, phosphates, phosphonates and hypochlorites of alkali metals or alkaline earth metals, in particular of sodium, alkali metal salts or alkaline earth metal salts of fatty or nonfatty organic acids, in particular citric acid, lactic acid, gluconic acid, formic acid, tartaric acid, acetic acid, lauric acid, stearic acid or oleic acid, primary, secondary or tertiary amines, aminated derivatives of alcohols, of acids or of polymer of acids, in particular 2-amino-2-methyl-1-propanol ("AMP"), aminated derivatives of di-, tri-, tetra- and pentaacetic, mono- and disuccinic, tartaric, citric and phosphonic acids, such as, for example, the aminated derivatives known to a person skilled in the art under the abbreviations of NTA, EDTA, DTPA, EDTMP, MGDA, EDMS and EDDS, and the mixtures of the abovementioned products.

Preferably, when it comprises at least one alkaline agent, the composition used according to the invention exhibits a pH greater than 8, preferably of greater than 8.5 and more preferably still of between 9 and 13.

The Applicant Company has in particular observed that a compound A such as DMI, in combination with an alkaline agent, such as disodium metasilicate or ammonia, for example within a detergent or cleaning composition, in particular with a pH of more than 8, has the effect of improving the degreasing power and saponifying power of said composition.

As indicated above, compound B, which is optional, in combination with the dianhydrohexitol ether (compound A), can also be chosen from acidic agents.

The term "acidic agents" is understood to mean any organic or inorganic acid, in particular those chosen from the group consisting of hydrochloric acid, sulfuric acid, phosphoric acid, sulfamic acid, citric acid, lactic acid, gluconic acid, formic acid, tartaric acid, acetic acid, octanoic acid, oleic acid and benzoic acid, and the mixtures of these acids.

Preferably, an organic acidic agent is used.

Preferably, when it comprises at least one acid agent, the composition used in accordance with the invention exhibits a pH of less than 5, preferably of less than 4.5, and more preferably still of between 1.5 and 4.

The Applicant Company has in particular observed that a compound A such as DMI, used in combination with an acid, such as lactic acid or sulfamic acid, for example within a stripping or descaling composition having a pH of less than 4.5, has the effect of increasing their solubilizing effectiveness.

The compositions used in the process according to the invention can additionally comprise one or more other constituents, the latter being chosen in particular from water, dyes, pigments, thickeners, gelling agents, active principles and surface active agents.

The term "active principles" is understood in particular to mean biocides, nematicides, molluscicides, insecticides, rodenticides, fungicides, herbicides and animal repellents.

The term "surface active agents" is understood to mean any surface active agent (or surfactant), whether anionic, cationic, amphoteric or nonionic. The anionic surface active agents can be chosen from alkylbenzene-sulfonates, paraffinsulfonates, olefinsulfonates, methyl ester sulfonates, alkyl ether sulfates, fatty alcohol sulfates, fatty acid soaps, fatty acid sulfo-alkylamides, sulfosuccinates, sulfates of diglycol-amides, N-acylated amino acids or polyoxyethylene carboxylates.

The cationic surface active agents can in particular be imidazolines, quaternary mono- or dialkylammoniums or quaternary ammonium esters.

The amphoteric surface active agents can in particular consist of amphoteric betaine derivatives, such as sulfonates and alkyl amidopropyl sulfobetaines or ethoxylated betaine.

The nonionic surface active agents which are the preferred surface active agents in the context of the present invention can be chosen in particular from ethoxylated fatty alcohols, alkylene oxide copolymers, in particular copolymers of ethylene or propylene oxide, amine oxides, amide alcohols, polyglycerol ethers, alkyl polyglucosides, alkyl polyglucosamides, esters of mono- or dianhydrohexitols, in particular sorbitan esters, which are or are not ethoxylated, or pentaerythritol esters.

Preferably, the surface active agent, in particular nonionic surface active agent, exhibits a biodegradability at 28 days of at least 20%, preferably of at least 70%, according to the "OECD 302 B" process mentioned above.

The Applicant Company has observed in particular that a compound A, such as DMI, in a stripping composition additionally comprising a nonionic surface active agent such as an oxyethylenated alkylphenol, has the effect, inter alia, of improving the contact of the composition with the surface of a wood-based material, indeed even of improving the stripping of said material.

The use of a dianhydrohexitol ether, preferably jointly with a compound B chosen from solubilizing agents, alkaline agents, or acidic agents, consequently constitutes a novel means, particularly well suited to current requirements, in particular technical, environmental and regulatory requirements, related to the general field of compositions intended for the surface treatment of metal or fibrous materials other than the human body, it being possible for said treatments and said materials to consist in particular of particularly be those indicated above.

These compositions can be in particular:

a) compositions intended for the surface treatment of a fibrous material, in particular a ligneous material such as wood, or a textile or paper material, chosen in particular from the group of paints, dyes, latexes, varnishes, lacquers, stains, stripping compositions, dedusting compositions, inks, adhesives and coating colours.

b) compositions intended for the surface treatment of a metal material, said compositions being in particular washing compositions, cleaning compositions, wetting compositions, rinsing compositions, degreasing compositions, dedusting compositions, stripping compositions, smooth-finishing compositions, varnishing compositions, rust prevention treatment compositions, corrosion prevention treatment compositions, lubricating compositions, painting compositions, gilding compositions, brightening compositions, coating compositions (including can coating compositions and coil coating compositions) or film-forming compositions, including thin-film-forming compositions,
c) compositions, particularly plant health compositions, intended for the surface treatment of a fibrous plant material, in particular of seeds, leaves, stems, flowers, fruits, vegetables and/or roots, or
d) compositions existing in the form of wipes intended for the surface treatment, in particular for the cleaning, degreasing, dedusting or scenting and/or for the disinfection, of any metallic or fibrous material, in particular ligneous material, and, for example, furniture or other articles made of wood.

A further subject matter of the present invention is the use of a dianhydrohexitol ether, preferably dimethyl isosorbide ("DMI"), for the preparation of a composition for surface treatment of a material other than the human body, chosen from metallic materials and fibrous materials.

The subject matter of the invention is also a composition for the surface treatment of a material other than the human body, chosen from metallic materials and fibrous materials, characterized in that it comprises at least one dianhydrohexitol ether, in particular dimethyl isosorbide ("DMI"). This composition additionally comprises at least one compound B chosen from solubilizing agents, alkaline agents and acidic agents.

The compositions of the present invention are preferably chosen from paints, dyes, latexes, varnishes, lacquers, adhesives, stains, inks, coating colours, detergents, window washes, cleaning, washing, wetting, rinsing, degreasing, dedusting, machining, cutting, stripping, abrasion, smooth-finishing, varnishing, rust prevention, corrosion prevention, lubricating, gilding, brightening, coating, film-forming, including thin-film-forming, disinfecting or deicing compositions, wipes and plant health compositions.

The compositions in question may in particular be aqueous paints, varnishes, lacquers, glues, stains, inks, coating colours or, more generally, any compositions, particularly film-forming compositions or coating compositions, based on latex, it being possible in such compositions for the dianhydrohexitol ether, in particular the DMI, to act, among other things, as a coalescence agent for said latex.

The present invention will be described in even more detail with the help of the following examples, which are in no way limiting.

EXAMPLE 1

Compositions for Degreasing Steel Sheets

Steel sheets covered with a thin, uniform film of different greases, lubricants or straight cutting oils commonly used in the metal-processing industry are degreased.

The degreasing effectiveness of the following compositions is compared:
Composition 1: trichloroethylene (TCE) sold by Riedel-De Haën under reference number 24254,
Composition 2: dichloromethane (DCM) sold by Riedel-De Haën under reference number 34488,
Composition 3: dipentene (DP) sold by Fluka under the reference number 42560,
Composition 4: ethyl lactate (EL) sold by Sigma-Aldrich,
Composition 5: dimethyl isosorbide (DMI) produced by the Applicant Company in the form of a colorless, odorless and slightly viscous solution exhibiting a dimethyl isosorbide purity of approximately 99.6%,
Composition 6: mixture in equal parts by weight of constituent DMI of Composition 5 and of constituent DP of Composition 3,
Composition 7: mixture in equal parts by weight of constituent DMI of Composition 5 and of constituent EL of Composition 4.

These compositions exhibit the properties indicated in the table below, said properties being denoted and recorded in the following way:

| COMPOSITION | CONSTITUENT(S) | FLA | VOL | RIN | BIO | ORI |
|---|---|---|---|---|---|---|
| 1 | TCE | − | ++ | 0 | − | − |
| 2 | DCM | − | ++ | 0 | − | − |
| 3 | DP | +/48° C. | ++ | 0 | + | + |
| 4 | EL | +/46° C. | + | + | + | + |
| 5 | DMI | +/120° C. | 0 | ++ | + | + |
| 6 | DMI/DP | +/95° C. | + | + | + | + |
| 7 | DMI/EL | +/96° C. | + | ++ | + | + |

*FLA = flammability: − = no; +/° C. = yes/flashpoint,
*VOL = volatility/aptitude for drying: 0 = low; + = moderate; ++ = high,
*RIN = rinsability with water: 0 = poor; + = good; ++ = excellent,
*BIO = biodegradability: 0 = no; + = yes,
*ORI = renewable origin: 0 = no; + = yes.

Compositions 1 and 2, based on chlorinated solvents, although flammable, are not biodegradable and are not of renewable origin, in contrast to the other compositions indicated. Furthermore, they are recognized as having a certain toxicity for man (compulsory labelings T, Xn, R40, R45 and/or R65) and for the environment (compulsory labelings R51/R53).

Compositions 3 and 4, although they are of renewable origin while being biodegradable, exhibit excessively low flashpoints, so that an R10 labeling is necessary (flashpoints of between 21 and 51° C.).

Composition 5 exhibits highly advantageous properties (sufficiently high flashpoint, excellent rinsability with water, renewable origin and intrinsically biodegradable). It is possible with this composition to obtain a dry surface by simple rinsing with water but it is necessary to introduce energy.

Compositions 6 and 7, in accordance with the invention, exhibit, with respect to Compositions 3 and 4, the advantage of being markedly safer with regard to a risk of explosion and of not requiring that R10 labeling be affixed. With respect to Composition 5, Compositions 6 and 7 have the same advantageous properties while exhibiting a much better aptitude for drying.

The performances of these 7 compositions are compared for 9 commercial greases and oils of different chemical mixtures.

These 9 fatty substances are denoted and defined in the following way:
FS1=paraffinic mineral oil
FS2=mixture of petroleum mineral oils,
FS3=food-grade mineral oil,
FS4=molybdenum disulfide grease,
FS5=mixture of mineral oil, of paraffinic hydrocarbons and of graphite,
FS6=polydimethylsiloxane oil
FS7=mutifraction oily mixture
FS8=biostable polyvalent microemulsion,
FS9=nonchlorinated special lubricant.

For the purpose of the evaluation, a cotton pad is impregnated with the test composition and then this cotton pad is brought into contact with a thin and uniform film of fatty substances deposited on the surface of a steel sheet. This operation is repeated twice. The steel sheet is subsequently rinsed with cold water, so as to remove the solvent. The degreasing effect is subsequently graded as follows:
Grade=1: visible residual presence of a thin greasy film,
Grade=2: visible residual presence of small greasy spots,
Grade=3: visible absence of fatty substance (degreased sheet).

The results obtained for each composition applied to each of the 9 fatty substances are summarized in the table below.

For each of Compositions 1 to 7, an "overall grade" is assigned to the function of the number of fatty substances for which the composition in question has not made it possible to achieve the grade of 3. This overall grade, with a maximum value of 10, is assigned in the following way:
10/10: the composition has obtained a grade of 3 for all of the 9 fatty substances,
9/10: the composition has obtained a grade of 3 for 8 fatty substances,
8/10: the composition has obtained a grade of 3 for 7 fatty substances,
7/10: the composition has obtained a grade of 3 for 6 fatty substances,
6/10: the composition has obtained a grade of 3 for 5 fatty substances.

For each Composition 1 to 7, the grade obtained a) for the specific degreasing of each of the fatty substances FS1 to FS9 deposited (grade from 1 to 3) and b) overall, as degreasing composition (grades from 6/10 to 10/10) is thus taken up in the table below.

| FATTY SUBSTANCE | COMP. | | | | | | |
| --- | --- | --- | --- | --- | --- | --- | --- |
| | 1 | 2 | 3 | 4 | 5 | 6 | 7 |
| FS 1 | 3 | 3 | 3 | 3 | 3 | 3 | 3 |
| FS 2 | 3 | 3 | 3 | 3 | 3 | 3 | 3 |
| FS 3 | 3 | 3 | 3 | 3 | 2 | 3 | 3 |
| FS 4 | 3 | 3 | 3 | 3 | 3 | 3 | 3 |
| FS 5 | 3 | 3 | 3 | 2 | 2 | 3 | 2 |
| FS 6 | 3 | 3 | 3 | 3 | 2 | 3 | 3 |
| FS 7 | 3 | 3 | 3 | 3 | 3 | 3 | 3 |
| FS 8 | 3 | 3 | 2 | 2 | 2 | 3 | 3 |
| FS 9 | 3 | 3 | 3 | 3 | 3 | 3 | 3 |
| OVERALL GRADE (/10) | 10 | 10 | 9 | 8 | 6 | 10 | 9 |

Compositions 4 and 5 appear, in the present case, to be less effective than the other compositions tested. However, they exhibit an undeniable degreasing effect and it is noteworthy to observe that Composition 5, based solely on DMI, makes it possible to remove, without visible residual traces, fatty substances as different in nature as the fatty substances FS 1, FS 2, FS 4, FS 7 and FS 9.

Composition 7 exhibits, contrary to all expectation, better degreasing performances than those of Compositions 4 and 5, whereas it is based on a mixture of DMI and of EL.

It is the same for Compositions 6, which proves to be more effective than Composition 3 or than Composition 5.

In fact, Compositions 5, 6 and 7, which can be used according to the invention constitute particularly advantageous products for use in degreasing due to their rinsability with water, their safety in use, their biodegradability, their renewable origin and, in particular for Compositions 6 and 7, their degreasing effectiveness with regard to highly varied types of greases and oils ordinarily used in the metal-surface-treatment industry. They can, including Composition 5, advantageously replace in this role the chlorinated solvents which are toxic and dangerous to health, which are TCE or DCM, or also the terpene compounds, such as DP and the lactates such as EL, the flashpoints of which are generally regarded as insufficiently high to avoid risks of explosion.

EXAMPLE 2

Latex-Based Film-Forming Compositions

The properties, as coalescence agents for latexes intended for preparation of water-based paints, of the following liquid compositions are compared:
Composition A: 2,2,4-trimethyl-1,3-pentanediol monoisobutyrate, as sold by Perstorb Oxo under the name Nexcoat® 795 and currently used as coalescence agent. This product is a glycol ether derivative,
Composition B: mixture of butyl esters of glutaric acid, succinic acid and adipic acid, as sold by Invista under the name DBE-IB®,
Composition C: dimethyl isosorbide (DMI) prepared by the Applicant Company in the form of a colorless, odorless and slightly viscous solution exhibiting a DMI purity of approximately 99.6%,
Composition D: mixture in equal parts by weight of Composition A (Nexcoat® 795) and of Composition C (DMI),
Composition E: mixture in equal parts by weight of Composition B (DBE-IB®) and of Composition C (DMI).

For each of Compositions A to E, the characteristics of odor ("ODOR"), of stability at alkaline pH, i.e. at a pH of 9 ("STAB.") and of risks of harmfulness in terms of protection of the aquatic environment/bioaccumulation ("BIO.") are taken up in the table below according to the following notation:
"ODOR": −=fairly strong; +=slight, ++=very slight,
"STAB": 0=moderate; +=good; ++=very good,
"BIO": −=harmful demonstrated; +=slight risk; ++=very slight risks.

| | ODOR | STAB. | BIO. |
| --- | --- | --- | --- |
| Composition A | + | + | − |
| Composition B | − | 0 | + |
| Composition C | ++ | ++ | ++ |
| Composition D | ++ | ++ | +/++ |
| Composition E | + | + | ++ |

For each of Compositions A to E, the ability to improve the coalescence of latexes during the drying thereof by departure of water is evaluated. The latex used consists of a dispersion in water of styrene/acrylic ester copolymer, sold by Cray Valley under the name Craymul® 2423.

The effect of the addition to this latex of 5.3% by weight of each of Compositions A to E, expressed with respect to the commercial weight of said latex, is measured and more specifically its effect on:
1) the change in the viscosity of the latex dispersion, this being the case for 7 days,
2) the properties of a film obtained after deposition of this dispersion on a sheet of glass or of Teflon and drying at ambient temperature for 24 hours.

The viscosity of the latex at 1 day ("VISC 1") and at 7 days ("VISC 7") corresponds to a Brookfield viscosity (20° C., 20 rpm). It is expressed here in thousands of millipascals seconds ($10^3$ mPa·s)

For each film produced, the characteristics of homogeneity ("HOM.") are studied by microscopic observation, of haze ("HAZE") by measurement on a "Haze-Gard Plus" device and of glass transition temperature ("TG" in ° C.) conventionally by DSC.

For each of Compositions A to E, the characteristics below were obtained for the latexes and films prepared in comparison with a latex/film ("Control") to which has not been added 5.3% of any composition.

|         | VISC 1 | VISC 7 | HOM | HAZE | TG    |
|---------|--------|--------|-----|------|-------|
| Control | 9.1    | 8.9    | −   | 9.9  | +18.2 |
| Comp. A | 24.4   | 24.1   | +   | 3.7  | −5.4  |
| Comp. B | 24.4   | 25.5   | +   | 3.6  | −7.2  |
| Comp. C | 4.8    | 4.8    | +   | 8.9  | +1.6  |
| Comp. D | 8.4    | 8.1    | +   | 6.4  | −11.7 |
| Comp. E | 8.8    | 8.9    | +   | 3.9  | −12.5 |

It is found that the latexes comprising Composition A or Composition B present a very high viscosity and a gelled structure, thus losing their property of being easy to pump and meter.

The addition of Composition C has a contrary effect, the resulting latex then exhibiting a fluidity which is admittedly enhanced but acceptable and thus retaining in any case a good ability to be pumped and metered.

This fluidifying property makes it possible advantageously to prepare latexes which are more concentrated and thus derived compositions (water-based paints, inks, coating colours) requiring a shorter drying time.

In contrast and unexpectedly, Compositions D and E, which can also be used according to the invention, furthermore do not significantly modify the viscosity of the latex or the change in its rheology over time.

The films obtained from Composition C, which can be used according to the invention, are of a general quality which is improved with respect to the control films.

The films obtained from Compositions D and E, which can also be used according to the invention, are moreover of a general quality which is even better (homogeneous films not covered with cracks, relatively low "HAZE" values), it being possible for this quality to be linked, at least in part, to the "TG" values measured, which are lowered in outstanding fashion and could not be imagined from the viewpoint of the values obtained, inter alia, with DMI alone (Composition C) on the one hand, and with each of the products "Nexcoat® 755" (Composition A) or "DBE-IB®" (Composition B) on the other hand.

Contrary to all expectation, the compositions according to the invention, in particular those combining a dianhydrohexitol ether (for example, DMI) and a compound B, such as a glycol ether derivative or a mixture of esters of nonfatty polyacids, can advantageously be used in the preparation of water-based paints, varnishes, lacquers, adhesives, stains, inks or coating colours or more generally of any latex-based compositions, in particular film-forming or coating compositions.

The Applicant Company has, in particular found that the compositions which can be used according to the invention make it possible to prepare water-based "matt" or "satin-finish" type paints with the possibility of complete substitution of the coalescence agents commonly used such as glycol ethers.

Most particularly, it has been observed, during the preparation of a white satin-finish paint comprising DMI and during its subsequent application on a fibrous material (wood), that the properties of the resulting paint before and after drying (rheology, rate of drying, gloss, hardness, final appearance), are as good, indeed even better as regards the whiteness before and after UV aging, than the properties obtained with paints formulated with conventional coalescence agents which do not comprise DMI.

EXAMPLE 3

Concentrated Liquid Composition for Machining Fluid of Very High Biodegradability An emulsion is prepared from a composition essentially comprising, by weight: 25% of water, 30.8% of methylesters of rapeseed oil, sold by Novance under the brand Lubrisorb® 926 65 (compound B), 16.3% of a dimethyl isosorbide (DMI) composition prepared by the Applicant Company and described in the preceding Examples (compound A), 15.4% of β-cyclodextrin, sold by the Applicant Company under the brand KLEPTOSE®, 10% of corrosion inhibitors and 1.5% of sorbitan-derived surfactants.

Said emulsion is prepared by mixing, on a colloidal mill, an aqueous phase composed of water, the β-cyclodextrin and a portion of the surfactants and an oily phase composed of the other ingredients mentioned above, including the methyl esters of rapeseed oil and the DMI.

It is apparent that the emulsion thus obtained is slightly viscous, easily diluted with water, stable over time, safe, as it does not comprise products, such as diethylene glycol ethers, ordinarily used in this type of formulation to adjust the viscosity and the physical stability, and non-corrosive with regard to steel in particular. Moreover, it exhibits good lubricating properties and good surface-wetting properties introduced both by the methylesters of rapeseed oil and the DMI. Finally, it comprises essentially only highly biodegradable products of renewable origin, which allows it to be removed by simple and nonpolluting processes.

What is claimed is:

1. A surface-treatment process which comprises:
   degreasing metallic materials with a composition consisting of
      more than 15% by weight of dimethyl isosorbide, and
      at least one solubilizing agent selected from the group consisting of dipentene and ethyl lactate.

2. The process according to claim 1, wherein the dimethyl isosorbide and the solubilizing agent are present within said composition in a dimethyl isosorbide/solubilizing agent weight ratio, expressed as dry weight/dry weight, of less than 98/2.

3. The process according to claim 1, wherein the composition is in the form of wipes.

4. The process according to claim 2, wherein the ratio is less than 95/5.

5. The process according to claim 1, wherein the dimethyl isosorbide is present at greater than 50% by weight.

\* \* \* \* \*